July 9, 1957     E. F. BRILL ET AL     2,798,434
LINEAR DYNAMO-ELECTRIC MACHINE WITH LIQUID
ARMATURE AND CURRENT COMPENSATION
Filed Oct. 28, 1953
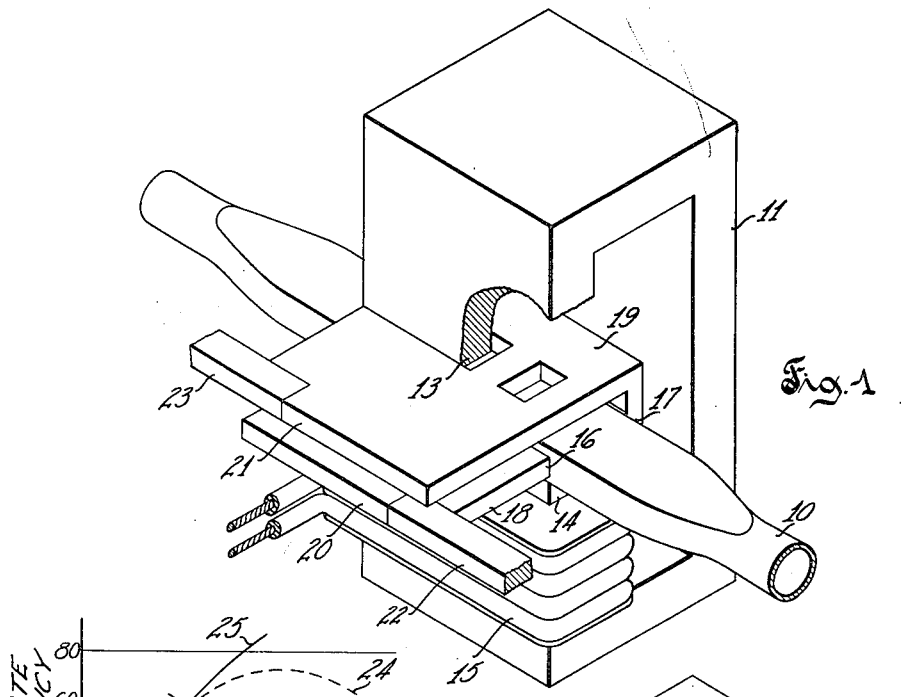
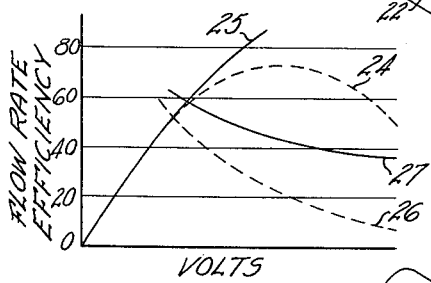
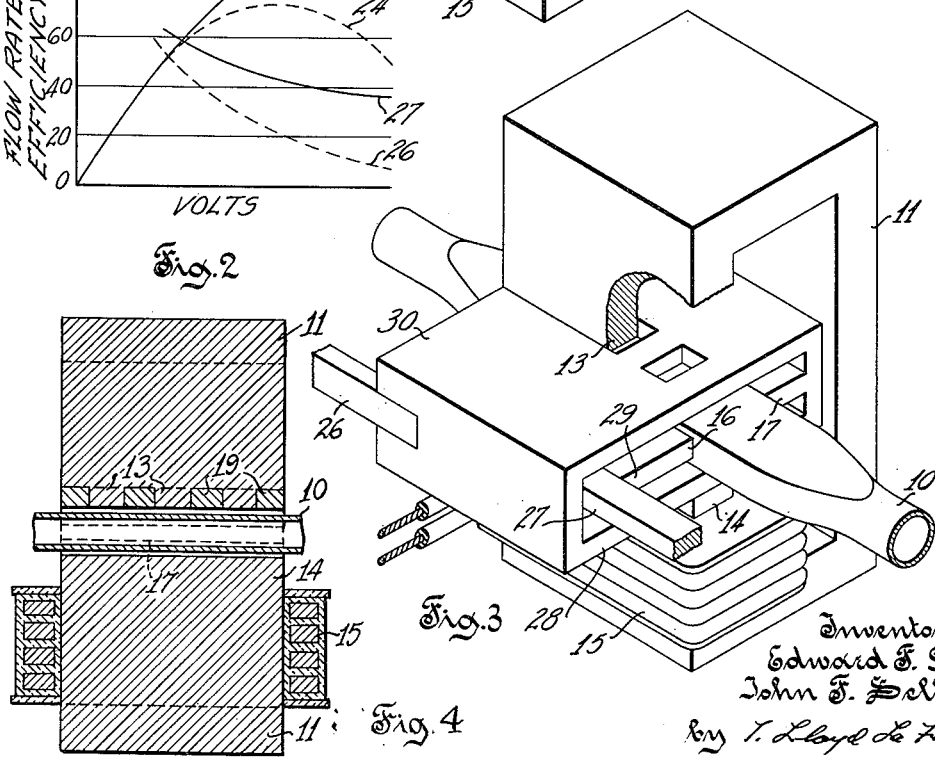
Inventors
Edward F. Brill
John F. Sellers
by T. Lloyd LaFave
Attorney

United States Patent Office 2,798,434
Patented July 9, 1957

2,798,434

LINEAR DYNAMO-ELECTRIC MACHINE WITH LIQUID ARMATURE AND CURRENT COMPENSATION

Edward F. Brill, Brookfield, and John F. Sellers, Granville, Wis., assignors to Allis-Chalmers Manufacturing Company, Milwaukee, Wis.

Application October 28, 1953, Serial No. 388,764

4 Claims. (Cl. 103—1)

This invention relates to a dynamoelectric machine having an electrically conductive fluid pass therethrough and more particularly to a direct current linear electromagnetic pump or generator.

In the operation of the machine such as a direct current electromagnetic pump, a current applied to the pump throat flows through the pumped liquid transversely to the flow of the liquid and a magnetic field is applied transversely to both the fluid flow and the current.

It can be shown that due to the superposition of the applied magnetic field and the field due to the applied currents through the fluid in a section of the conduit herein referred to as the throat of the pump, the field flux is distributed non-uniformly along the throat in the direction of fluid flow, the flux concentrating at the fluid entrance to the throat. The resulting distribution of the throat currents is also non-uniform with the throat currents concentrating at the fluid exit to the throat. Any current through the metal not within the magnetic field does not contribute to the pressure output of the pump. Therefore the pump efficiency will be poor when the throat currents concentrate at one end of the throat and the field flux concentrates at the other end of the throat. Such throat currents and flux distributions limit the pump to low electrical efficiency. Moreover, the developed pump pressure is a maximum for a given throat current and decreases for increased throat currents.

According to the present invention the distribution of the field flux in the pump throat is made uniform and the throat currents are also uniformly distributed. Such uniform distribution of the field flux and throat currents is obtained by conducting the throat current across the top or bottom of the pump throat in a direction opposite the direction of the current through the fluid in the throat. By such compensation the pressure developed by the pump for a given field excitation is not only increased but the pressure developed by the pump continues to increase with further increases in the throat currents.

It is, therefore, an object of the present invention to provide a direct current dynamoelectric machine such as an electromagnetic pump having its field flux uniformly distributed in the pump throat.

Another object is to provide a direct current electromagnetic pump whose output pressure continues to increase with increases in throat current.

Another object is to provide compensation which is effective independently of the use of an iron core.

Other objects and advantages will be apparent to one skilled in the art upon reading the following description together with the following drawing, in which:

Fig. 1 is a perspective view of a direct current linear pump embodying the present invention;

Fig. 2 shows curves of the flow and efficiency of compensated and uncompensated pumps;

Fig. 3 shows a modification of the pump of Fig. 1; and

Fig. 4 shows a sectional view taken on a vertical plane through the axis of the conduit of the pump of Fig. 1.

Referring to the drawing, reference numeral 10 indicates a longitudinal channel or conduit for containing an electrically conductive fluid to be pumped. Such a fluid may comprise a liquid metal such as a sodium-potassium alloy. Means providing a uniform magnetic field comprise an iron core 11 having poles 13, 14 on opposite sides of the conduit. The conduit substantially fills the gap between the poles. The core is provided with a suitable coil 15 which is energized from a source of direct current, not shown, to provide a magnetic field transverse to the conduit so the path of the field flux through the fluid is at right angles to the flow of the fluid.

Field coil 15 may be connected to a separate source of excitation current or it may be connected in series with the throat conductor or in shunt therewith. Field coil 15 may have any suitable number of turns depending on the field amperes it is intended to carry and the ampere turns required for the magnetic field.

The section of the conduit between the field poles may be flattened if desired to provide a minimum thickness gap.

Electrodes 16, 17 are secured to the conduit at the throat for passing electric current through the liquid metal at right angles to both the magnetic field and the direction of flow of the metal. Bars or plates 18 are secured to opposite sides of the conduit as by welding or brazing to form the electrodes 16, 17 at the throat of the conduit. The conduit is preferably made of a high ohmic resistance material such as stainless steel so that the electrode current flows primarily through the fluid which has a relatively low ohmic resistance.

Means compensating for the distortion or non-uniform distribution of the magnetic field, due to the currents through the throat, include an electrical conductor adjacent the throat and within the field for passing current in a direction opposite to the direction of the current in the liquid metal. This conductor means may comprise a suitable copper sheath or plate of electrically conductive solidified material superposed across the throat and between a pole piece and the throat, but to keep the flux gap a minimum this conductor means preferably comprises a plate 19 made up of a solid plate having spaced apertures receiving toothed portions of the core and defining a plurality of parallel connected bars extending through a face of one of the poles. The pole face may be slotted for receiving the conductors which pass therethrough. Plate 19 has one end connected to an end of plate 18. The other or free ends of plates 18 and 19 may form terminals 20, 21 for connection through suitable terminal leads 22, 23 to a source of direct current such as a unipolar generator. Plate 18, interrupted by the throat, passes current through the liquod metal, and superposed plate 19 being in series therewith passes throat current adjacent the top or bottom of the throat in a direction opposite to the direction of current flow in the metal. The current in plate 19 cancels the magnetic effect which the current in the metal has on the distribution of the field flux and the field flux is therefore uniformly distributed.

A theoretical comparison of a compensated pump with an uncompensated pump is illustrated in Fig. 2, in which curve 24 represents the fluid flow for an uncompensated pump and curve 25 the flow for the same pump with compensation. Curve 24 shows that for an uncompensated pump the maximum flow is reached with a certain voltage and that a further increase in voltage causes the flow to diminish. Curve 25 shows that for a compensated pump the same voltage produces a greater flow and that further increases in the voltage causes the flow to further increase. Curves 26, 27, show the relative efficiencies of the uncompensated and compensated pumps, respectively, within a desired working range of the pumps. The compensated pump shows an efficiency better than twice that of the uncompensated pump at the maximum flow for the uncompensated pump.

In the operation of the dynamoelectric machine as an electromagnetic pump, a source of excitation current is connected to the field coil 15 and a source of low voltage direct current is connected to terminals 20, 21 which current is conducted by the fluid in the throat of the pump between the electrodes in series with compensating plate 19. The field flux and the current in the fluid react to force the fluid along the throat of the pump to effect the desired pumping action. The pressure developed by the pump may be controlled by varying either the throat current or the field current or by varying both the throat and field currents.

In the operation of the dynamoelectric machine as a generator fluid is forced through the conduit and excitation current is supplied to the field coil to produce a magnetic field through the moving fluid. Voltage generated in the fluid appears across terminals 20, 21 which will cause current to flow in an external low resistance circuit. The amount of electric current may be controlled by varying the strength of the magnetic field and by varying the flow of the fluid. When operated as a generator with field coil 15 connected in series with the throat conductors, generator action may be started by the residual magnetism of the core. Initial magnetism for starting generator action may also be provided by an auxiliary coil, not shown, disposed about a leg of the coil and supplied with excitation current.

The dynamoelectric machine may also be employed as an electromagnetic valve to control the flow of the electrically conductive fluid. To effect a flow valve, the conduit of the dynamoelectric machine is connected in the flow system and the machine is operated as a pump or as a generator to vary the fluid flow in the system. The machine may be operated as a pump connected to oppose the fluid flow of the system and effect throttling of the fluid or it may be connected to boost the flow of the system in the manner of a booster pump.

When the machine is operated as a generator, it retards the fluid flow in the manner of an electromagnetic brake. A variable low ohmic resistance load is connected across the terminals of the machine to vary the flow of throat current and the field current may also be varied to vary the strength of the magnetic field for varying the braking effect on the fluid flow.

Fig. 3 shows a compensated direct current linear pump having three superposed plates 28, 29, 30. The outer two plates 28, 30 are connected in parallel to form the compensating current conductor for the pump. The intermediate plate 29 is interrupted by the throat portion of the conduit to form electrodes 16, 17 therein for passing electric current through the liquid metal in the throat. Intermediate plate 29 is connected in series with plates 28, 30. Bars 26, 27 are connected to the free ends of the plates to form lead conductors therefor. This machine may also be operated as an electromagnetic pump, generator or flow valve as described for the embodiment shown in Fig. 1.

Although but a few embodiments of the present invention have been shown and described, changes and modifications may be made therein without departing from the spirit of the invention or from the scope of the appended claims.

It is claimed and desired to secure by Letters Patent:

1. A linear direct current dynamoelectric machine operable as an electromagnetic generator or as an electromagnetic pump comprising a conduit containing an electrically conductive fluid serving as the armature of said machine, means establishing a magnetic field through said armature transversely of the direction of the flow of the fluid, said armature conducting electric current in one direction through said magnetic field transversely thereof and transversely of the flow of the fluid, an electrical conductor of solidified material disposed in said magnetic field adjacent said armature and connected in series therewith conducting armature current in the opposite direction through said magnetic field to cancel the distorting effect of the armature current through the fluid on said magnetic field.

2. A linear direct current dynamoelectric machine operable as an electromagnetic generator or as an electromagnetic pump comprising a conduit containing an electrically conductive fluid serving as the armature for said machine, means establishing a magnetic field through said armature transversely of the flow of said fluid, said armature conducting electric current in one direction through said magnetic field transversely thereof and transversely of the flow of the fluid, an electrical conductor of solidified material disposed above said armature within said magnetic field and an electrical conductor of solidified material disposed below said armature within said magnetic field, said conductors connected in parallel with each other and in series with said armature conducting said armature current above and below said armature and adjacent thereto in the direction opposite to said one direction through said magnetic field to effect a uniformly distributed field through said armature.

3. A linear direct current dynamoelectric machine operable as an electromagnetic generator or as an electromagnetic pump comprising a conduit containing an electrically conductive fluid serving as the armature of said machine, means including magnetic poles establishing a magnetic field through said armature transversely of the direction of the flow of the fluid, said armature conducting electric current in one direction through said magnetic field transversely thereof and transversely of the flow of the fluid, electrical compensating conductors of solidified material extending through the pole face of one of said poles and connected in parallel with each other and in series with said armature conducting armature current in the opposite direction through said magnetic field to cancel the distorting effect of the armature current through the fluid on said magnetic field.

4. A linear direct current dynamoelectric machine operable as an electromagnetic generator or as an electromagnetic pump comprising a conduit containing an electrically conductive fluid serving as the armature for said machine, a field magnet comprising poles on opposite sides of said armature for producing a magnetic field through said armature transversely of the flow of said fluid, said armature conducting electric current in one direction through said magnetic field transversely thereof and transversely of the flow of the fluid, electrical conductors of solidified material extending through the pole face of one of said poles and electrical conductors of solidified material extending through the pole face of the other of said poles, said conductors connected in parallel with each other and in series with said armature for conducting said armature current in the opposite direction through said magnetic field.

References Cited in the file of this patent

UNITED STATES PATENTS

| | | |
|---|---|---|
| 1,660,407 | Bainbridge | Feb. 28, 1928 |
| 2,607,223 | Fleming | Aug. 19, 1952 |
| 2,616,109 | Wakefield | Sept. 30, 1952 |
| 2,686,474 | Pulley | Aug. 17, 1954 |